United States Patent Office 3,507,861
Patented Apr. 21, 1970

3,507,861
CERTAIN 3-METHYL-CEPHALOSPORIN COMPOUNDS
Robert B. Morin and Billy G. Jackson, Indianapolis, Ind., assignors to Eli Lilly and Company, Indianapolis, Ind., a corporation of Indiana
No Drawing. Continuation-in-part of application Ser. No. 213,588, July 31, 1962. This application Sept. 14, 1966, Ser. No. 579,222
Int. Cl. C07d 99/24
U.S. Cl. 260—243
16 Claims

ABSTRACT OF THE DISCLOSURE

Certain 3-methyl-cephalosporin compounds useful as antibiotics, e.g., 3-methyl-7-(D-α-aminophenylacetamido)-Δ³-cephem-4-carboxylic acid, now known generically as cephalexin, especially of interest for its use as an antibiotic when administered by the oral route.

---

This application is a continuation-in-part of our application Ser. No. 213,588, filed July 31, 1962, now Patent No. 3,275,626.

The present invention relates to antibiotic substances. More particularly it relates to certain penicillin-derived antibiotic substances and to novel methods for their production.

The first of the antibiotics to be discovered were the penicillins, which contain the penam nucleus, a thiazolidine ring with a fused β-lactam. A more recent discovery is the cephalosporins, which contain the Δ³-cephem nucleus, a dihydrothiazine ring with a fused β-lactam. These two classes of antibiotics are thus somewhat related in structure, as will be seen from the following general structural formulas:

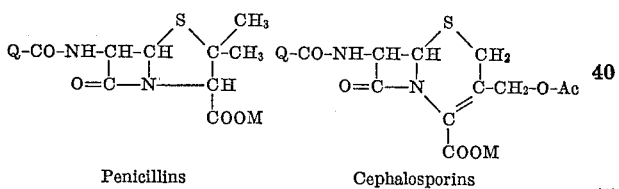

wherein Q represents essentially any organic radical, as exemplified by hundreds of examples in the prior art, and M represents a pharmaceutically acceptable cation. The penam nomenclature for the penicillins is described by Sheehan, Henery-Logan, and Johnson in the J. Am. Chem. Soc., 75, 3293, footnote 2 (1953), and has been adapted to the cephalosporins by Morin, Jackson, Flynn, and Roeske in the J. Am. Chem. Soc., 84, 3400 (1962). In accordance with these systems of nomenclature, "penam" and "cepham" refer respectively to the following saturated ring structures:

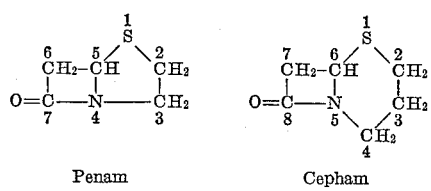

while "penam" and "cepham" refer to the same ring structure with a double bond, the position of which is indicated by a prefixed "Δ" with superscript denoting the carbon atom of lowest number to which the double bond is connected.

While both the penicillins and the cephalosporins have been remarkably effective in the treatment of a variety of infections, there is a continuing need for different and improved antibiotics. There has also been a need for a simple and economical method for synthesizing the cehalosporin compounds from available starting materials.

One object of the present invention is to prepare novel antibiotic substances.

Another object is to prepare modified cephalosporins.

Other objects of the invention and its advantages over the prior art will be apparent from the following description, operating examples, and claims.

In one aspect, the present invention affords a novel class of compounds having the following structure:

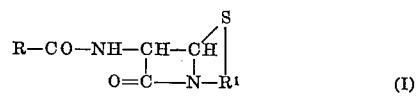

where R is an organic radical as hereinafter defined, and R¹ has a structure represented by one of the following formulas:

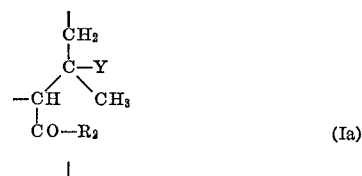

(Ia)

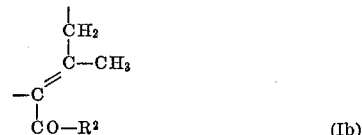

(Ib)

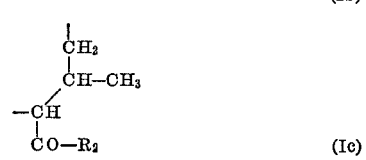

(Ic)

where R², when linked directly to the molecule, is —NH₂, —NH—(C₁–C₄ alkyl), or —N=di(C₁–C₄ alkyl);
where R², when linked to the molecule through —O—, is hydrogen, a pharmaceutically acceptable cation, C₁–C₄ alkyl, C₄–C₇ cycloalkyl, or phenyl;
and where Y is C₂–C₄ alkanoyloxy or C₁–C₄ alkoxy.

In the above formulas, R², when linked directly to the molecule to form amides, may be exemplified by

CH₃NH—, C₂H₅NH—, C₄H₉NH—, (CH₃)₂N—, (C₂H₅)₂N—, and CH₃(C₂H₅)N—. When linked to the molecule through an oxygen atom to form carboxylic acids, salts, and esters, R² may be exemplified by hydrogen; sodium, potassium, and ammonium; methyl, ethyl, n-propyl, isopropyl, n-butyl, sec.-butyl, isobutyl, and tert.-butyl; cyclobutyl, cyclopentyl, cyclohexyl, and cycloheptyl; and phenyl, which may be in substituted form, e.g., chlorophenyl, bromophenyl, trichloromethylphenyl, nitrophenyl, methoxyphenyl, tolyl, and the like, the substituents being in the o-, m-, or p-position, and further substitution with these and other substituents being permitted.

Y may be exemplified by acetoxy, propionoxy, butyroxy, methoxy, ethoxy, propoxy, butoxy, and the like.

Thus, among the compounds of the invention are the cephem compounds of the following structure:

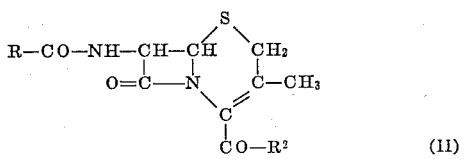

and the dihydro derivatives thereof, wherein R and $R^2$ are as defined elsewhere herein.

Also included are cepham compounds of the following structure:

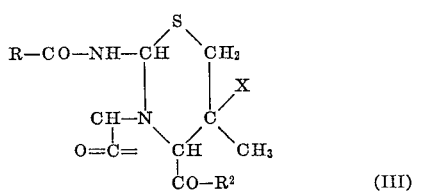

wherein R, $R^2$, and Y are as defined elsewhere herein.

The side chain R of the penicillin starting material (and thus of the cephalosporin product) can be chosen from a wide variety of organic radicals which are stable under the reaction conditions and which yield products of improved properties. Suitably R has the structure

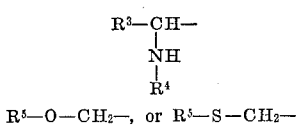

$R^5-O-CH_2-$, or $R^5-S-CH_2-$ where
$R^3$ is phenyl, or phen($C_1-C_4$)alkyl;
$R^4$ is hydrogen or methyl; and
$R^5$ is $C_1-C_8$ alkyl or a member of the same group as $R^3$, the various rings having optionally one or more substituents such as halo, alkyl, nitro, amino, acyl, trifluoromethyl, alkoxy, alkylmercapto, and the like.
Where R has the structure

it will be apparent that the product can exist in the form of the inner salt or as a salt of a pharmaceutically acceptable acid, or the like and such salt forms are considered to lie within the scope of the invention as claimed.

Thus, R may be chosen from the following types of structures:

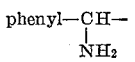

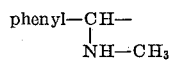

phenyl—O—CH$_2$—
phenyl—S—CH$_2$—
phenalkyl—O—CH$_2$—
phenalkyl—S—CH$_2$—
($C_1-C_8$ alkyl)—O—CH$_2$—
($C_1-C_8$ alkyl)—S—CH$_2$—

Illustrative penicillins (and cephalosporin products) include, but are not limited to, the following, referring only to the R group thereof, attached through —CO—NH— to the antibiotic nucleus:

Phenoxymethyl
Benzyloxymethyl
Phenethoxymethyl
n-Hexyloxymethyl
Ethylmercaptomethyl
n-Butylmercaptomethyl
Phenylmercaptomethyl
Benzylmercaptomethyl
Phenethylmercaptomethyl
α-Aminobenzyl
α-(Methylamino)benzyl.

The penicillins can be employed in the form of the free acids; the sodium, potassium, amine, or other salts; the methyl, ethyl, n-butyl, or other esters; or the amide, the N-methylamide, the N,N-diethylamide, or other amides, the choice depending to some extent upon the desired end product, since the course of the reaction is influenced by the structure of the penicillin at the carboxyl group, as pointed out below.

Further illustrative examples of the products of the present invention include the following, but it is to be understood that the invention is not limited thereto:

3-propionoxy-3-methyl-7-phenylmercaptoacetamido-cepham-4-carboxylic acid sodium salt
7-(p-fluorobenzylmercaptoacetamido)-3-methyl-$\Delta^3$-cephem-4-carboxylic acid potassium salt
7-phenethylmercaptoacetamido-3-methyl-$\Delta^3$-cephem-4-carboxylic acid potassium salt
3-methyl-7-n-butylmercaptoacetamidocepham-4-carboxylic acid butyl ester In one method for preparing the compounds of the present invention, a penicillin having a 6-acylamido substituent group as desired is first subjected to treatment with an oxidizing agent such as metaperiodic acid to produce the corresponding sulfoxide. The latter is then heated to elevated temperature in the presence of an acidic substance such as acetic anhydride or sulfuric acid or the like, thereby producing the desired substance.

The acid substance can be employed in catalytic proportions, of the order of 1 to 10 percent by weight of the penicillin sulfoxide, where the acid substance does not supply an element of the desired product. The catalytic reaction is thus feasible in the production of the compounds of the invention which do not include the radical Y. When the desired product does include the radical Y, the acid substance must afford the radical in equimolar proportion to the penicillin sulfoxide.

No solvent or other liquid medium is necessary for the reaction, but is desirable in order to facilitate heat transfer and to moderate the reaction. Any organic liquid can be used as the reaction medium so long as it is substantially inert to the other reactants under the conditions employed. A preferred solvent and acid reactant combined in acetic anhydride. The reaction temperature should lie in the range of about 100 to about 175° C., preferably about 125 to about 150° C. The conversion is generally found to reach a substantial level after as little as 5 minutes, and is ordinarily complete in less than one hour. The reaction time should be kept as short as possible in order to minimize the formation of undesirable by-products.

After completion of the reaction, the reaction mixture is cooled, and the solvent, if any, is stripped off at reduced pressure. The residue obtained thereby is separated into its components by any convenient method, such as chromatography over silica gel or the like, employing a ketonic solvent for the elution. Other adsorbent solids may be employed as desired, such as silica-alumina, cellulose, Florisil, or the like. For the solvent, methyl isobutyl ketone, methyl ethyl ketone, or acetone can be employed, diluted to some extent with a nonpolar solvent such as hexane, cyclohexane, or benzene, and preferably containing at least some proportion of water, up to the saturation level. The crude substance is first dissolved in an organic solvent such as the eluting solvent to be used thereafter, which solution is applied to the chromatographic column. Elution is then carried out, the eluate fractions being checked by thin-layer chromatography to identify the products in the successive fractions. The appropriate fractions are combined and are further treated to isolate the individual products, suitably by crystallization.

The free acids and salts of the products of the invention can be obtained from the esters or amides by selective hydrolysis in a conventional manner, or from suitable esters by catalytic hydrogenolysis.

Generally speaking, it is desirable to treat the pencillin sulfoxide in the form of an ester or an amide, in order to avoid loss of the carboxyl group in the 4-position.

In the new compounds provided by the present invention, the β-lactam has greater chemical and penicillinase stability than the compounds of the prior art. The acids and salts exhibit the ability in greater or lesser degree to destroy or inhibit the growth of many microorganisms, among which are the Staphylococci, the Streptococci, and the Bacilli. Numerous uses for the compounds will thus be apparent from the art; e.g., as topical sterilants. The esters and amides are useful as intermediates in the production of the acids and salts. The products of the invention are additionally useful as intermediates for the synthesis of still newer antibiotic substances, in particular certain derivatives of cephalosporin C. The unsaturated compounds can be reacted, for example, with oxidizing agents, carboxylating agents, halogenating agents, and other substances to produce derivatives of modified or enhanced effectiveness. They can be hydrogenated in the presence of palladium catalysts to produce the saturated compounds. Modified cephalosporins can be obtained by oxidizing cephem compounds by known techniques for oxidizing allylic carbon atoms, employing, for example, N-bromosuccinimide, lead tetraacetate, or selenium dioxide.

The structures of the compounds of the present invention have been proved by way of their infrared, ultraviolet, and nuclear magnetic resonance spectra. They are conveniently analyzed by the method of Ford, Analytical Chemistry, 19, 1004 (1946), which is based upon the quantitative determination of the β-lactam moiety of the molecule via reaction with hydroxylamine. Their antibiotic potencies are readily determined against a standard organism such as *Staphylococcus aureus* 209 P by appropriate modifications of the paper disc plate methods of Higgens et al., Antibiotics & Chemotherapy, 3, 50–54 (1953) and Loo et al., Journal of Bacteriology, 50, 701–709 (1945).

The invention will be more fully understood from the following operating examples:

Example 1

*Penicillin V sulfoxide.*—Sodium metaperiodate (8.0 g.) was added in one portion with stirring to a solution of 15.5 g. of penicillin V potassium salt in 300 ml. of water at room temperature, and stirring was continued while occasional starch-iodide tests for active oxygen were made. After 45 minutes the test became negative. The mixture was then diluted with 100 ml. of water and acidified to pH 2.3 with dilute hydrochloric acid. Penicillin V sulfoxide was precipitated thereby as the free acid, and was collected and recrystallized from aqueous methanol (1:2). The product weighed 12.3 g. and melted at 163–164° C. with decomposition.

*Penicillin V sulfoxide methyl ester.*—Three grams of penicillin V sulfoxide in the form of the free acid were suspended in 30 ml. of ethyl acetate. The suspension was stirred at room temperature, and to it was added a dilute solution of diazomethane in ethyl ether until the yellow color persisted. The mixture was then evaporated to dryness at reduced pressure and the residue was recrystallized from aqueous methanol. The product, weighing 2.5 g., was the methyl ester of penicillin V sulfoxide, melting at 120–122° C. Further recrystallization yielded an analytical sample melting at 121.5–122.5° C., $[\alpha]_D = +200.0$.

*Acetoxymethylpenam and acetoxycepham derivative.*— A solution of 500 mg. of penicillin V sulfoxide methyl ester in 35 ml. of acetic anhydride was heated at reflux for one-half hour and then evaporated to dryness at reduced pressure. The oily residue obtained thereby was taken up in ethyl acetate and the solution was washed successively with cold dilute aqueous soidum bicarbonate solution, water, and saturated aqueous sodium chloride solution. The washed solution was dried over sodium sulfate and evaporated to dryness at reduced pressure. The amorphous product (530 mg.) obtained thereby was chromatographed through a silicic acid column, using a mixture of cyclohexane and methyl isopropyl ketone (4:1) saturated with water as the eluting solvent. The eluate was collected in 7-ml. fractions at 20-minute intervals, which were analyzed by thin-layer chromatography and suitably combined for product isolation.

Fractions 75–88, 195 mg., constituted the penam derivative, 2-methyl-2-acetoxymethyl-3-carbomethyl-6-phenoxyacetamidopenam. This material was rechromatographed for analysis.

Fractions 110–115, 15 mg., were primarily the cepham derivative, 3-methyl-3-acetoxy-4-carbomethoxy-7-phenoxyacetamidocepham.

Fractions 89–105, 130 mg., were a mixture comprising principally the penam and cepham products. This material, on being subjected to rechromatography, yielded 50 mg. of the cepham compound. Both this material and the material from fractions 110–115 were amorphous, and contained a small proportion of 3-methyl-4-carbomethoxy-7-phenoxyacetamide-$\Delta^3$-cephem, as indicated by the nuclear magnetic resonance spectra.

The two products thus obtained were compared in antibiotic activity according to the following procedure. Samples of the products were individually incubated at pH 7 in phosphate buffer for 20 hours at 37° C. with shaking. At the end of the incubation period, the solutions were subjected to assay against various microorganisms by the conventional paper disc plate method. The incubated solutions were also tested by paper electrophoresis followed by bioautographic assay. Both the penam and the cepham were active against *Staphylococcus aureus* and *Bacillus subtilis*, but not against gram-negative organisms. The cepham produced a zone size approximately half as great as that produced by the penam at the same concentration. On paper electrophoresis of the two products, acid antibiotics were seen which had the same mobility as penicillin V.

Example 2

$\Delta^3$-*cephem derivative.*—A solution of 5.0 g. of penicillin V sulfoxide methyl ester and 160 mg. of p-toluenesulfonic acid in 60 ml. of xylene was heated at reflux for one hour and was then evaporated to dryness at reduced pressure. The residue was dissolved in ethyl acetate and the resulting solution was washed successively with dilute aqueous sodium bicarbonate solution, water, and saturated aqueous sodium chloride solution, then dried and evaporated at reduced pressure, yielding 4.5 g. of a dark-colored oil. The oil was chromatographed through 80 g. of silicic acid in a column with a mixture of chloroform and benzene (1:1) as the eluting solvent, the eluate being withdrawn in 7-ml. fractions. Fractions 115–225, 1.23 g., were combined and evaporated to dryness at reduced pressure, and the residue was crystallized from methanol-ether. The product weighed 306 mg. and melted at 137–138° C. A second crop of crystals weighed 174 mg. and melted at 128–136° C. Recrystallization yielded an analytical sample melting at 141–142° C.

*Analysis.*—Calc. for 3-methyl-4-carbomethoxy-7-phenoxyacetamido-$\Delta^3$-cephem, $C_{17}H_{18}N_2O_5S$ (percent): C, 56.34; H, 5.00; N, 7.73; S, 8.85. Found (percent): C, 56.26; H, 5.08; N, 7.54; S, 8.93.

When subjected to incubation in pH 9 phosphate buffer for 20 hours at 37° C. with shaking, then subjected to assay by the paper disc plate method, the product showed antibacterial activity against *S. aureus* and *B. subtilis* which was not affected by penicillin β-lactamase.

Example 3

$\Delta^3$-*cephem derivative, alternative preparation.*—7-phenoxyacetamidocephalosporanic acid methyl ester (549 mg.) in dioxane (45 ml.) was contacted with hydrogen at room temperature and 1200 p.s.i. in the presence of 2.0 g. of 10 percent palladium-on-charcoal. The treated solution was filtered and evaporated to dryness at reduced pressure. The residue was subjected to chromatographic separation on 10 g. of silica gel (E. Merck), using 5 percent ethyl acetate in chloroform as the elution solvent.

Fractions 5 and 6, 97 mg., were a mixture of starting material and 3-methyl-4-carbomethoxy-7-phenoxyacetamido-$\Delta^3$-cephem. This material was rechromatographed using 2 percent ethyl ether in chloroform as the elution solvent, and 11 mg. of the $\Delta^3$-cephem compound were obtained which was identical in every way (infrared, ultraviolet, melting point, mixed melting point, X-ray diffraction) to that prepared by the sulfoxide rearrangement of Example 2.

Fractions 7–9, 275 mg., of the original chromatogram contained pure starting ester.

Fractions 10 et seq. yielded the dihydro derivative of the starting ester, as indicated by infrared, ultraviolet, and nuclear magnetic resonance spectra.

Example 4

*Penicillin V sulfoxide benzhydryl ester.*—Penicillin V sulfoxide in the form of 15.0 g. of the free acid was suspended in 200 ml. of ethyl acetate, and to the stirred suspension was added an excess of diphenyldiazomethane (Organic Syntheses, Collective Volume 3, page 351) in ether at room temperature. At the end of 20 minutes, a clear red solution had been obtained. The solution was allowed to stand overnight at room temperature and was then evaporated at reduced pressure. The residual material, a red gum, was crystallized from acetone and petroleum ether. The product, penicillin V sulfoxide benzhydryl ester, weighed 17.4 g. and melted at 155–156° C., $[\alpha]_D = +191.3°$.

*Analysis.*—Calc. for $C_{29}H_{28}N_2O_6S$ (percent): C, 65.39; H, 5.30; N, 5.26. Found (percent): C, 65.61; H, 5.29; N, 4.92.

$\Delta^3$-*cephem benzhydryl ester.*—Penicillin V sulfoxide benzhydryl ester (5.0 g.) and dry p-toluenesulfonic acid (140 mg.) were suspended in 100 ml. of xylene and refluxed for 30 minutes. The resulting solution was evaporated to dryness at reduced pressure. The residue was dissolved in ethyl acetate and washed successively with dilute aqueous sodium bicarbonate solution, water, and saturated aqueous sodium chloride solution, and the washed solution was evaporated to dryness at reduced pressure, yielding 4.7 g. of crude product. Chromatography of this material through a silicic acid column with cyclohexane-methyl isobutyl ketone (4:1) as the eluting solvent yielded 422 mg. of the desired product, 3-methyl-4-carbobenzhydryloxy-7-phenoxyacetamido - $\Delta^3$ - cephem, melting at 156–157° C. after recrystallization from methanol and having $[\alpha]_D = +30.3°$.

*Analysis.*—Calc. for $C_{29}H_{26}N_2O_5S$ (percent): C, 67.68; H, 5.09; N, 5.44; S, 6.23. Found (percent): C, 67.63; H, 5.20; N, 5.26; S, 6.30.

Example 5

*Acetoxycepham benzhydryl ester.*—Penicillin V sulfoxide benzhydryl ester was reacted with acetic anhydride according to the procedure of Example 1. The product was a mixture of the benzhydryl esters of 2-methyl-2-acetoxymethyl - 6 - phenoxyacetamido-penam-3-carboxylic acid and 3-methyl-3-acetoxy-7-phenoxyacetamidocepham-4-carboxylic acid.

Example 6

3 - *methyl-7-phenoxyacetamido-$\Delta^3$-cephem-4-carboxylic acid.*—3-methyl-4-carbobenzhydryloxy - 7 - phenoxyacetamido-$\Delta^3$-cephem (100 mg.) was dissolved in 6 ml. of dioxane containing a trace of dry hydrogen chloride, and to the solution was added a suspension of 200 mg. of prereduced 10 percent palladium-on-charcoal in dioxane. The mixture was agitated with hydrogen at room temperature and atmospheric pressure, and a hydrogen uptake of 3.98 ml. (theoretical, 4.75 ml.) was observed over a period of 18 hours. The hydrogenation product was filtered and evaporated to dryness at reduced pressure. The residue thus obtained was dissolved in ethyl acetate, layered with water, and adjusted to pH 7 with dilute aqueous sodium hydroxide solution. The layers were separated. The ethyl acetate phase was washed with water, dried, and evaporated to dryness at reduced pressure. The neutral material thus obtained, weighing 50 mg., was identical to the benzhydryl starting ester. The aqueous phase and washings were combined, layered with ethyl acetate, and acidified to pH 2 with dilute hydrochloric acid. The ethyl acetate phase was separated, washed with water, dried, and evaporated to dryness at reduced pressure. The acidic material thus obtained, weighing 16 mg., was the free acid, 3-methyl-7-phenoxyacetamido-$\Delta^3$-cephem-4-carboxylic acid, having a $pK_a$ in 66 percent aqueous dimethylformamide of 5.7. The structure of the material was confirmed by its nuclear magnetic resonance spectrum. The potassium salt was prepared in crystalline form and was found to have an antibiotic assay against *Staphylococcus aureus* of 12 penicillin G units per milligram.

Example 7

The following additional compounds, illustrative of class Ib, above, were also prepared via hydrogenation of the 3-acetoxymethyl analogue as illustrated generally in Example 3, and all were found to be effective as antibiotics against penicillin-resistant strains of *Staphylococcus aureus*:

7-(D-α-aminophenylacetamido)-3-methyl-$\Delta^3$-cephem-4-carboxylic acid 7-(dl-α-amino-m-chlorophenylacetamido)-3-methyl-$\Delta^3$-cephem-4-carboxylic acid 7-(dl-α-amino-p-chlorophenylacetamido)-3-methyl-$\Delta^3$-cephem-4-carboxylic acid 7-(dl-α-amino-p-chlorophenylacetamido)-3-methyl-$\Delta^3$-cephem-4-carboxylic acid trifluoroacetate 7-(dl-α-amino-m-bromophenylacetamido)-3-methyl-$\Delta^3$-cephem-4-carboxylic acid 7-(dl-α-amino-m-bromophenylacetamido)-3-methyl-$\Delta^3$-cephem-4-carboxylic acid trifluoroacetate 7-(dl-α-amino-m-fluorophenylacetamido)-3-methyl-$\Delta^3$-cephem-4-carboxylic acid 7-(dl-α-amino-m-methoxyphenylacetamido)-3-methyl-$\Delta^3$-cephem-4-carboxylic acid 7-(dl-α-amino-m-methoxyphenylacetamido)-3-methyl-$\Delta^3$-cephem-4-carboxylic acid trifluoroacetate 7-(D-α-amino-m-hydroxyphenylacetamido)-3-methyl-$\Delta^3$-cephem-4-carboxylic acid 7-(p-chlorophenoxyacetamido)-3-methyl-$\Delta^3$-cephem-4-carboxylic acid potassium salt 7-(m-nitrophenoxyacetamido)-3-methyl-$\Delta^3$-cephem-4-carboxylic acid potassium salt 7-phenylmercaptoacetamido-3-methyl-$\Delta^3$-cephem-4-carboxylic acid potassium salt 7-(n-butylmercaptoacetamido)-3-methyl-$\Delta^3$-cephem-4-carboxylic acid potassium salt 7-(m-chlorophenylmercaptoacetamido)-3-methyl-$\Delta^3$-cephem-4-carboxylic acid potassium salt 7-(o-trifluoromethylphenylmercaptoacetamido)-3-methyl-
Δ³-cephem-4-carboxylic acid potassium salt

We claim:
1. A compound of the structure

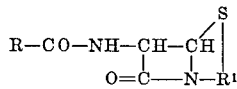

where R¹ is a member of the group represented by the following formulas:

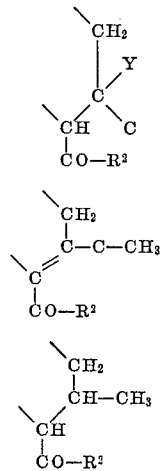

Y is $C_2$–$C_4$ alkanoyloxy or $C_1$–$C_4$ alkoxy;
$R^2$, when connected directly to the molecule, is —$NH_2$, —NH—($C_1$–$C_4$ alkyl), or —N=di($C_1$–$C_4$ alkyl); and
$R_2$, when connected through —O— to the molecule, is hydrogen, a pharmaceutically acceptable cation, $C_1$–$C_4$ alkyl, $C_4$–$C_7$ cycloalkyl, or phenyl;
R is a member of the group represented by the following formulas:

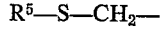

and $R_3$ is phenyl or phen($C_1$–$C_4$)alkyl;
$R^4$ is hydrogen or methyl; and
$R^5$ is $C_1$–$C_8$ alkyl, phenyl or phen($C_1$–$C_4$)alkyl.

2. A compound as in claim 1, having the structure

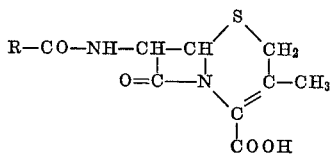

where R is a member of the group represented by the following formulas:

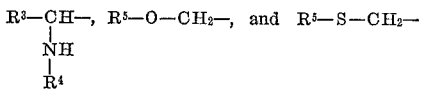

$R^3$ is phenyl or phen($C_1$–$C_4$)alkyl;
$R^4$ is hydrogen or methyl; and
$R^5$ is $C_1$–$C_4$ alkyl, phenyl or phen($C_1$–$C_4$)alkyl.

3. A compound as in claim 1, said compound being 3 - methyl - 3 - acetoxy - 4 - carbomethoxy - 7 - phenoxyacetamidocepham.

4. A compound as in claim 1, said compound being 3-methyl-4-carbomethoxy-7-phenoxyacetamide-Δ³-cephem.

5. A compound as in claim 1, said compound being 3-methyl - 4 - carbobenzhydryloxy-7-phenoxyacetamido-Δ³-cephem.

6. A compound as in claim 1, said compound being 3 - methyl - 3 - acetoxy - 7 - phenoxyacetamidocepham-4-carboxylic acid.

7. A compound as in claim 1, said compound being 7-phenoxyacetamide-3 - methyl-Δ³-cephem-4 - carboxylic acid.

8. A compound as in claim 1, said compound being 7 - phenylmercaptoacetamido - 3 - methyl - Δ³ - cephem-4-carboxylic acid.

9. A compound as in claim 1, said compound being 7 - (n - butylmercaptoacetamido) - 3-methyl-Δ³-cephem-4-carboxylic acid.

10. A compound as in claim 1, said compound being 7-(m-chlorophenylmercaptoacetamido) - 3 - methyl-Δ³-cephem-4-carboxylic acid.

11. A compound as in claim 1, said compound being 7 - (o - trifluoromethylphenylmercaptoacetamido) - 3-methyl-Δ³-cephem-4-carboxylic acid.

12. A compound as in claim 1, said compound being 7-(α-aminophenylacetamido)-3-methyl-Δ³ - cephem - 4-carboxylic acid.

13. A compound as in claim 1, said compound being 7-(α-amino-m-chlorophenylacetamido) - 3 - methyl-Δ³-cephem-4-carboxylic acid.

14. A compound as in claim 1, said compound being 7-(p-chlorophenoxyacetamido) - 3 - methyl - Δ³-cephem-4-carboxylic acid.

15. A compound as in claim 1, said compound being 7-(α-amino-m - hydroxyphenylacetamido) - 3 - methyl-Δ³-cephem-4-carboxylic acid.

16. 7-(D-α-aminophenylacetamido) - 3 - methyl - Δ³-cephem-4-carboxylic acid.

References Cited

UNITED STATES PATENTS 3,131,184  4/1964  Chow et al.
3,167,550  1/1965  Chow et al.
3,324,118  6/1967  Flynn.

NICHOLAS S. RIZZO, Primary Examiner

U.S. Cl. X.R.
260—999